(12) United States Patent
Haney et al.

(10) Patent No.: US 8,533,054 B1
(45) Date of Patent: Sep. 10, 2013

(54) BUYER GLOBAL SEARCH

(75) Inventors: Stefan M. Haney, Seattle, WA (US); Aravind Yalamanchi, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 122 days.

(21) Appl. No.: 13/053,580

(22) Filed: Mar. 22, 2011

(51) Int. Cl.
*G06Q 30/06* (2012.01)
*G06Q 30/02* (2012.01)

(52) U.S. Cl.
CPC ............... *G06Q 30/06* (2013.01); *G06Q 30/02* (2013.01)
USPC ........................................................ 705/26.1

(58) Field of Classification Search
USPC ........................................................ 705/26.1
See application file for complete search history.

(56) References Cited

U.S. PATENT DOCUMENTS

| | | | |
|---|---|---|---|
| 6,324,534 B1 * | 11/2001 | Neal et al. | 1/1 |
| 2002/0077929 A1 * | 6/2002 | Knorr et al. | 705/26 |
| 2002/0107718 A1 * | 8/2002 | Morrill et al. | 705/10 |
| 2003/0200156 A1 * | 10/2003 | Roseman et al. | 705/27 |
| 2006/0259467 A1 * | 11/2006 | Westphal | 707/3 |
| 2007/0022014 A1 * | 1/2007 | Lee | 705/26 |
| 2007/0078733 A1 * | 4/2007 | Kumar et al. | 705/27 |
| 2010/0241507 A1 * | 9/2010 | Quinn et al. | 705/14.42 |

\* cited by examiner

*Primary Examiner* — Amee A Shah
(74) *Attorney, Agent, or Firm* — Thomas | Horstemeyer, LLP

(57) ABSTRACT

Embodiments for implementing a buyer global search in electronic commerce include a method of detecting, by a computing device, that a search query for a product item within a first marketplace is unsuccessful and in response to the unsuccessful search query, executing the search query for the product item within a second marketplace. The method further includes detecting that the search query for the product item within the second marketplace is successful; and in response to the successful search query in the second marketplace, offering a user that submitted the search query in the first marketplace to purchase the product item being sold by a seller.

23 Claims, 13 Drawing Sheets

BUYER GLOBAL SEARCH

BACKGROUND

Some online forums or electronic marketplaces allow users to sell and buy goods or products within one geographic region or a marketplace targeting a particular geographic region as opposed to another geographic region or marketplace. Therefore, a desired good may be found in one marketplace and not another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present application describes systems and methods for introducing goods to new marketplaces. Enabled by the systems and methods described herein, users are able to manage and sell inventory to prospective buyers online within an electronic marketplace targeting a particular geographic region or demographic showing a demand for the inventory. Further, the systems and methods enable users to discover a desired good within a marketplace or channel outside of a user's domain, region, or demographic. These features as well as others will be described in further detail below.

An electronic marketplace may target users from a particular geographic region. In this way, the electronic marketplace may utilize the same currency, language, shipping rates, etc. for all the users within the same geographic regions. For users of a different geographic region, a proprietor of the first electronic marketplace may setup a second electronic marketplace that targets or caters to users from the second geographic region. For example, a retail merchant may have an electronic marketplace with the internet address www.acme.com targeting users in the United States and a second electronic marketplace with the internet address www.acme.co.uk targeting users in the United Kingdom.

Figure 1:
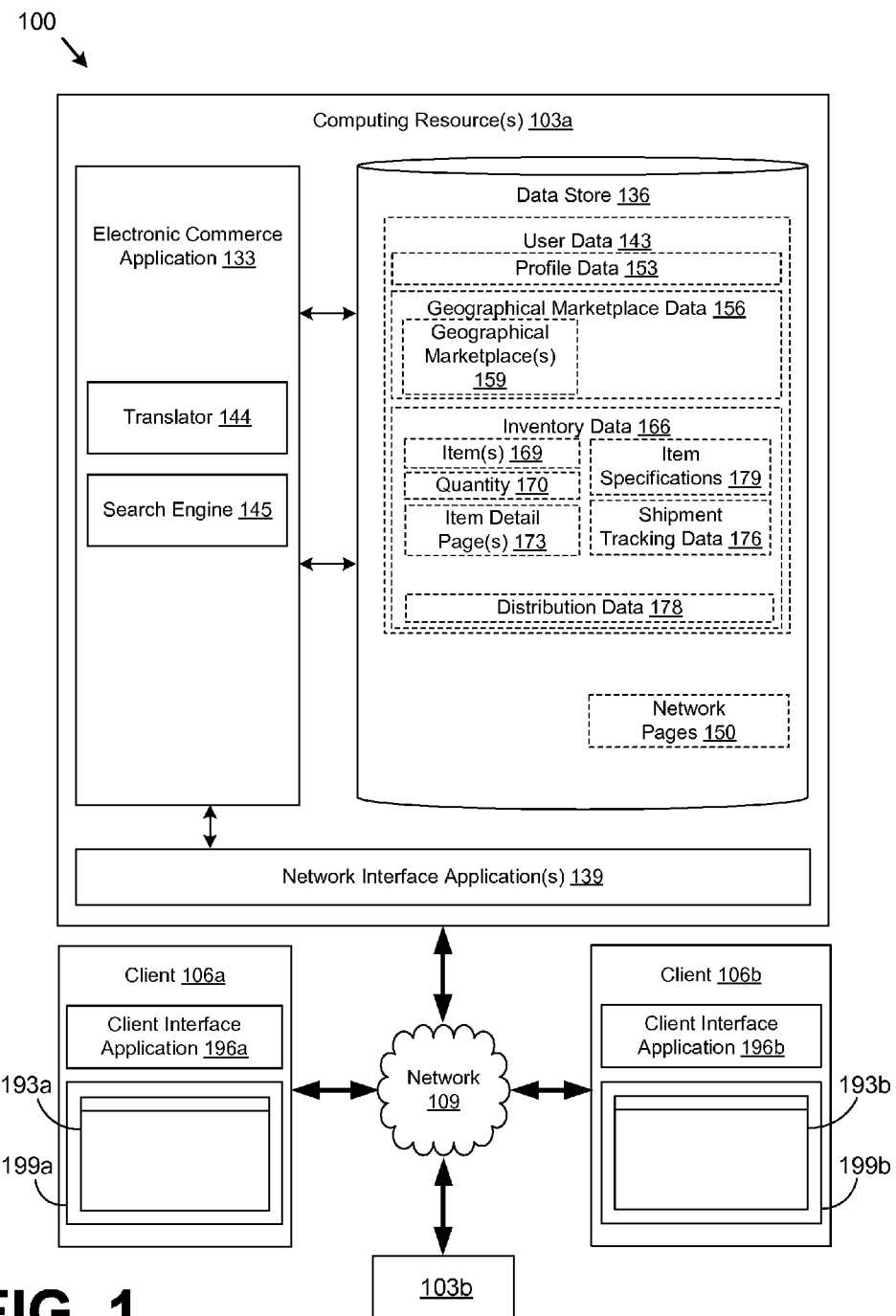
FIG. 1 is a drawing of a data communications network according to various embodiments of the present disclosure.

In the following discussion, a general description of the system and its components is provided, followed by a discussion of the operation of the same. With reference to FIG. 1, shown is a data communications network 100 according to various embodiments. The data communications network 100 includes a computing device 103a, a plurality of clients 106 (denoted herein as a first client 106a and a second client 106b), and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103a may comprise, for example, a server computer or any other computing device or system providing computing capability. The computing device 103a may represent multiple computer systems arranged, for example, in one or more server banks or other arrangements. To this end, the computing device 103a may comprise, for example, a cloud computing device, a grid computing device, and/or any other distributed computing arrangement. Such computer systems may be located in a single installation or may be dispersed among many different geographical locations. For purposes of convenience, the computing device 103a is referred to herein in the singular. However, in some embodiments, the computing device 103a represents a plurality of computer systems arranged as described above. In one embodiment, computing device 103a implements a first electronic marketplace targeting a first geographic region. Likewise, computing device 103b implements a second electronic marketplace targeting a second geographic region.

Various applications and/or other functionality may be executed in the computing device 103a according to various embodiments. Also, various data is stored in a data store 136 that is accessible to the computing device 103a. The data store 136 may be representative of a plurality of data stores as can be appreciated. The data stored in the data store 136, for example, is associated with the operation of the various applications and/or functional entities described below.

The computing device 103a and data store 136 may be considered as a data center. In one embodiment, the data center facilitates an online forum that allows users to sell and buy goods or products within one geographic region or marketplace. Within the same data center or a separate data center, other forum(s) that allow users to sell and buy goods in a different geographic region or marketplace may be implemented.

The data store 136 stores, for example, user data 143, network pages 150, and potentially other data. The user data 143 is data associated with a user and also includes profile data 153. In this context, a user refers to a party that uses the functionality of the electronic commerce application 133 to buy, sell, or offer items for sale to prospective buyers in a particular forum and corresponding marketplace. However, the user or the prospective buyers may or may not have ownership or control of the computing device 103.

The profile data 153 includes a variety of information regarding the identity of the user, such as a user name, contact information, bank account information, and/or other data relevant to the identity of the user. When the user is a company, the profile data 153 may include a company name, a state of incorporation, a name of a company representative, and/or other data relevant to the identity of the company. The contact information may include a mailing address, an email address, a telephone number, a fax number, or other contact information. Also, the bank account information may include a bank name, a routing number, and an account number in order to facilitate payment and deposit transactions.

The user data 143 further includes geographical marketplace data 156 regarding one or more geographical marketplaces 159. A geographical marketplace 159 corresponds to a country, city, region, or a combination of countries, cities, or regions where a user may sell or offer to sell product items 169.

The user data 143 further includes inventory data 166 regarding one or more product items 169 for which the user may employ the electronic commerce application 133 to sell, offer to sell, track, or otherwise manage. To that end, the inventory data 166 includes item detail pages 173, which are web pages or other types of network content that are provided to clients 106, such as the second client 106b, for the purposes of enabling prospective buyers to select items 169 for purchase, rental, download, lease, or other forms of consumption. Each item detail page 173 is associated with a geographical marketplace 159 and customized for selling one or more items 169 within the geographical marketplace 159. For example, the text of an item detail page 173 may be written in a language commonly used in the geographical marketplace 159. Further, the units of measure and sizes of the item 169 detailed on the item detail page 173 may also correspond to the geographical marketplace 159. Additionally, the item detail page 173 may indicate whether the item 169 is available for purchase in the geographical marketplace 159. For example, the item detail page 173 may include a status field that says whether the item 169 is "In Stock" or available.

In general, the item detail page 173 provides general product information including information that pertains to features of the product item. The item detail page may be used by other sellers to list their inventory for the same product item.

In some embodiments, the inventory data 166 further includes information about the quantity 170 of the items 169 that the user has in inventory or has sold. Also, the inventory data 166 includes item specifications 179 that include information about the dimensions and weight of the item 169, which may be relevant for shipping purposes as well as for displaying on corresponding item detail pages 173. The inventory data 166 also includes shipment tracking data 176 regarding the current location of a shipment of the item 169 or plurality of items 169. In addition, the inventory data 166 includes distribution data 178 regarding where the items 169 are located or being offered for sale.

The data store 136 further stores network pages 150 associated with various aspects of providing information to and gathering data from a user of the functionality of the electronic commerce application 133. Examples of various network pages 150 will be discussed in further detail below.

The components executed on the computing device 103, for example, include an electronic commerce application 133, as well as other applications, services, processes, systems, engines, or functionality not discussed in detail herein. The electronic commerce application 133 is executed to facilitate the online selling and purchasing of items 169 over the network 109. The electronic commerce application 133 also performs backend functions associated with the online presence of a merchant in order to facilitate the online purchase of items 169 as will be described. For example, as briefly discussed above, the electronic commerce application 133 also enables users to sell items 169 in more than one marketplace or geographic region and manage inventory and shipments of the items 169. Additionally, the electronic commerce application 133 generates item detail pages 173, such as web pages or other types of network content that are provided to clients 106 (e.g., the second client 106b) for the purposes of selecting items for purchase, rental, download, lease, or other forms of consumption to prospective buyers.

The electronic commerce application 133 also enables searching of inventories within a marketplace. For example, a prospective buyer may use a search engine application 145 provided by the electronic commerce application 133 to search inventories and user data for a particular marketplace. In some occasions, a buyer may search for an item that is not found in a particular marketplace and extend the search to a second marketplace.

In one embodiment, the electronic commerce application 133 may analyze search queries that did not return a proper match with respect to a first marketplace and apply the same search queries on another marketplace (second marketplace) to see whether a matching item is present in the second marketplace. In the situation where a matching item is found in the second marketplace, a seller of the matching item in the second marketplace can be invited to participate as a seller in the first marketplace.

From the buyer's perspective, in one embodiment, when a buyer performs a search for an item within a first marketplace and is unable to find a matching item, the electronic commerce application 133 may perform the search in a second marketplace. If a matching item is found in the second marketplace, the electronic commerce application 133 may offer the matching item for sale to the buyer in the first marketplace when the item is not initially available in the first marketplace. The electronic commerce application 133 may adjust the price of the item within the second marketplace to a new price that is suitable for the first marketplace. For example, new shipping charges may have to be considered and additional transaction fees may have to be added, such as additional taxes or other miscellaneous fees. For example, an electronic marketplace may charge a merchant a commission for the sale of an item. Such a commission may be a percentage of the price and/or a fixed fee. Such transaction costs may be automatically built into the pricing model for the items offered through the electronic commerce application 133. It is noted that the transaction costs may vary among the electronic marketplaces. In addition, product information may be adjusted for presentation in the new marketplace. For example, language, currency, and measuring standards used in describing a product of the second marketplace may have to be converted to an appropriate form for the first marketplace.

Accordingly, an online forum for one marketplace may share information with an online forum for a second marketplace. As previously mentioned, different forums and marketplaces may be stored on different computing devices 103a, 103b, or maybe co-located on a single computing device 103a.

The clients 106 are denoted herein as a first client 106a and a second client 106b. Each of the clients 106 is coupled to the network 109. Also, each of the clients 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. To this end, each of the clients 106 may comprise a mobile device as can be appreciated. Each of the clients 106 may include, for example, various peripheral devices. In particular, the peripheral devices may include input devices such as, for example, a keyboard, keypad, touch pad, touch screen, microphone, scanner, mouse, joystick, or one or more push buttons, etc. The peripheral devices may also include display devices 199a, 199b, indicator lights, speakers, etc. Specific display devices 199a, 199b may be, for example, cathode ray tubes (CRTs), liquid crystal display (LCD) screens, gas plasma-based flat panel displays, LCD projectors, or other types of display devices, etc.

Executed within the first client 106a and the second client 106b are various applications including a browser 193, denoted as a first client browser 193a and a second client browser 193b, respectively. The first client browser 193a and the second client browser 193b are configured to interact with the network interface application 139 according to an appropriate protocol. The first client browser 193a and the second client browser 193b may be executed in the first client 106a and the second client 106b, respectively, for example, to access and render network pages 150, such as web pages, or other network content served up by the computing device 103 and/or other servers. The first client 106a and the second client 106b may be configured to execute applications beyond the first client browser 193a and the second client browser 193b, such as, for example, email applications, instant message applications, and/or other applications.

When executed in a client 106a, 106b, the respective browser 193a, 193b renders a respective user interface on a respective display device 199a, 199b and may perform other functions. The first client browser 193a and the second client browser 193b access network pages 150 such as web pages or other types of content from the computing device 103 in order to access the functionality of the electronic commerce application 133 and other components implemented in the computing device 103 as will be described.

Figure 2:
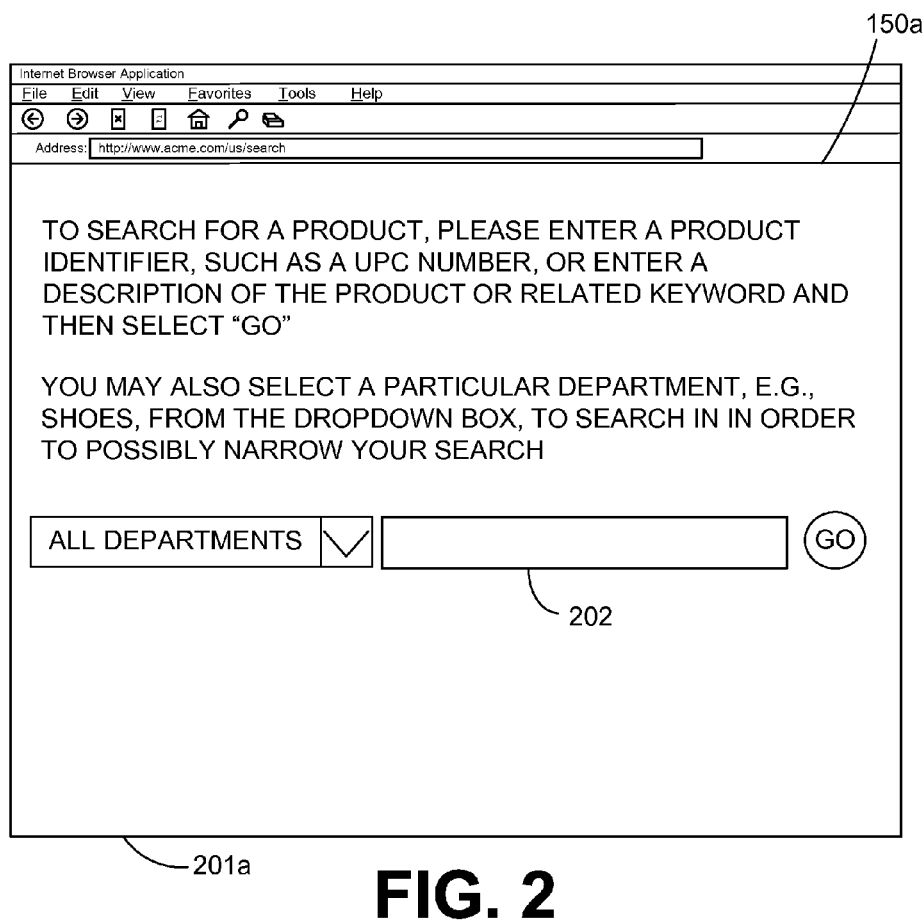
FIG. 2 is a drawing of an example user interface rendered by a first client in the data communications network of FIG. 1 according to various embodiments of the present disclosure.
Figure 4:
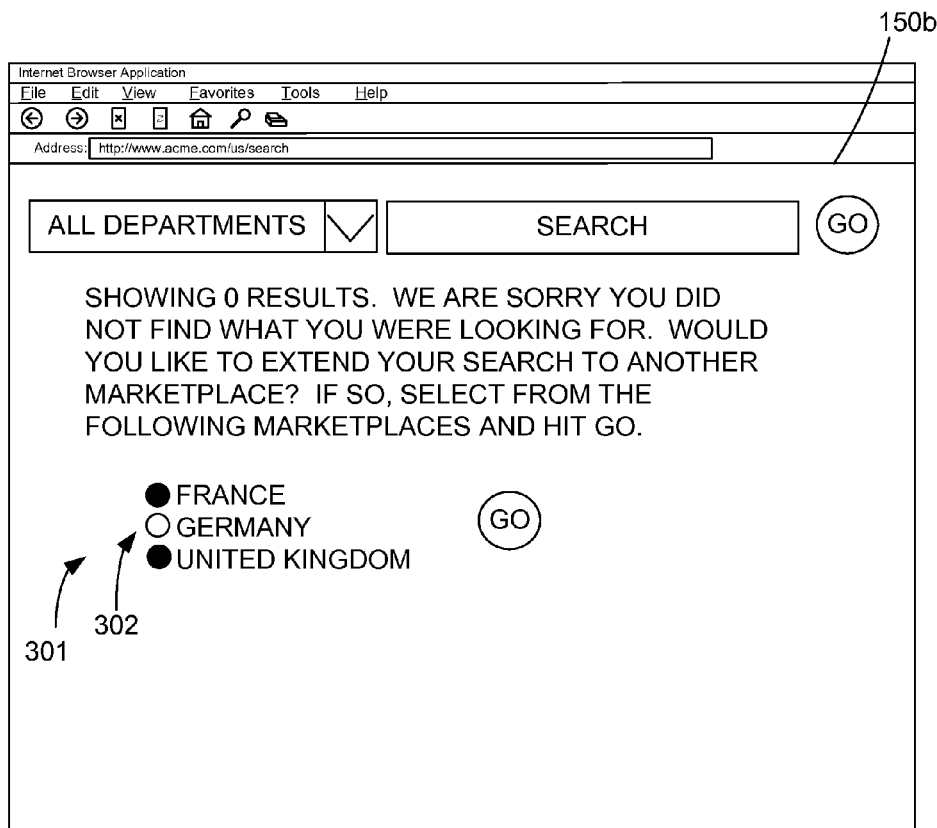
FIGS. 4-5 are drawings of example user interfaces rendered by a first client in the data communications network of FIG. 1 according to various embodiments of the present disclosure.

Referring next to FIGS. 2 and 4-5, various user interfaces 201 generated in association with the operation of the electronic commerce application 133 (FIG. 1) are described. It is understood that such user interfaces 201 are merely examples of the many different user interfaces 201 that may be generated to accomplish the various purposes discussed. To this end, the components included in the various user interfaces 201 are presented herein as examples, where other types of components may be employed in their place to accomplish the same underlying purpose. Further, the various components may be manipulated using various input devices such as keyboards, a mouse, microphones, and other devices as can be appreciated.

FIGS. 2 and 4-5 illustrate an example of a user interface 201, denoted herein as user interface 201a, rendering various network pages 150 (FIG. 1). The network page 150 is rendered in a user interface on the display device 199 (FIG. 1) of the first client 106a (FIG. 1). Information stored in the data store 153 (FIG. 1) on the computing device 103 (FIG. 1) may be presented to a user on the network page 150 communicated by the network interface application 139 (FIG. 1) over the network 109 (FIG. 1) to the first client 106a. Also, the user interface 201a provides one example of the many different user interfaces that may be created for different types of display devices 199 employed on a respective client 106. For example, the user interface 201a may be formatted differently to fit on a small display screen of a personal digital assistant or other mobile device, etc. Additionally, different graphical user interface (GUI) components may be used.

The network page 150a illustrated in FIG. 2 is a search page 150a for gathering keywords to a search query (FIG. 1). Specifically, the search page 150a includes field(s) 202 for inputting the keywords, such as product name, product identifiers (Universal Product Code (UPC), European Article Number (EAN), International Standard Book Number (ISBN)), or product descriptors. Accordingly, a user enters the keywords into an appropriate field using the user interface 201a rendered on a first client 106a, and the keywords to the search query is sent to the computing device 103, which searches inventories of items being offered for sale in the data store 136 (FIG. 1).

Consider searching for a product on an online forum for a first marketplace corresponding to a United States marketplace (e.g., having an internet address ending in .com, www.xxx—marketplace name—xxx.com). A user inputs keywords in a search engine and submits a command to execute the search. The search engine application 145 searches the inventories of the online forum, and in this scenario, finds an item detail page of a product matching the search query. However, there is no current inventory of products being offered for sale within the marketplace. In other words, there are no sellers available for the United States marketplace that have the product in their current inventory of products that are being sold.

In one embodiment, the electronic commerce application 133 detects an unsuccessful search for a product in the United States marketplace and in response, automatically performs a search of the keywords on another marketplace. For example, a second marketplace may be tailored for users from Germany. As a result of the search, a seller from the second marketplace is found offering a matching item for sale within the second marketplace (Germany marketplace). This seller may be selected to offer the item for sale in the first marketplace (United States marketplace), since the first marketplace has users searching for a product for which there is a dearth of sellers currently selling the product in the first marketplace. If the seller accepts the offer, the seller may then be listed as a seller in the first marketplace for the product item 169.

Since an item detail page 173 of the product matching the user's query was found in the first marketplace, the item detail page 173 or a link to the item detail page 173 is provided to the user in the results to the search query. Further, product information for the seller from the second marketplace is also provided with the item detail page 173, when the item detail page is rendered for a user of the first marketplace.

If an item detail page 173a is not available within the first marketplace or not found (e.g., United States search query may not match with German title for item), the item detail page 173b from the second marketplace may be presented in its place to the user. However, content of the item detail page 173b may be converted or translated to conform to standards and languages used in the first marketplace, when they differ from standards and languages used in the second marketplace.

The electronic commerce application 133 may use a threshold value to determine whether the search results for a product item within a first marketplace are indicative of the item being considered not found (e.g., unsuccessful). However, use of the threshold value may be dependent upon a type of keyword or search field that constitutes the search query.

For example, a user can search for a product item 169 using a product identifier, such as a UPC or EAN, which is a unique and exact identifier. Any search results having the same product identifier should be considered a match (e.g., successful) and therefore a threshold value will not be needed to be considered. Accordingly, search results based on a product identifier may have a high confidence factor associated with them, since it is unlikely that a non-matching product will have the same product identifier.

But if keywords within a search query correspond to a product title or some other content in a product description, it will be harder to determine whether search results precisely match with the subject of the search. For example, a user may input a search query for an item and only get back a small number of results (less than a threshold value). Therefore, the user is given the option to extend the search in other marketplaces (e.g., perform a search using the same search query in a different marketplace), in one embodiment. Accordingly, search results based on product descriptors, such as general keywords, may have a lower confidence factor associated with them, since different products may be associated with the same product descriptors, as an example.

When an option is provided to search in other marketplaces, the user, in one embodiment, is asked by the electronic commerce application 133 whether the user can understand a particular language. Then, a search is performed in a marketplace that uses the particular language. Accordingly, when a language barrier exists, a user may be given an option to limit extending a search to particular marketplaces that utilize language(s) understood by the user. In some embodiments, electronic commerce application 133 features a translator application 144 which translates content from one marketplace and converts it to comply with a buyer's preference. Also, the translator application 144 may be used to translate keywords used in the search query and translation of contents result from the search. The translator application 144 may also, in advance, replicate detail pages 173 or inventory data 166 in different languages other than a native language of the respective marketplace.

Accordingly, in one embodiment, a user may be asked by the electronic commerce application 133 if he or she is able to navigate a marketplace in which a search has been extended and corresponding search results are able to be provided. If the user responds by indicating that he or she is capable of navigating the particular marketplace, then the user is directed to a website of the particular marketplace. For example, although the user is located in the United States, the user may be bilingual and able to understand a marketplace targeted towards users from France. Accordingly, the user will be presented the results of the extended search in the particular marketplace (e.g., the marketplace in France) and the user may purchase, in the particular marketplace (e.g., the marketplace in France), an item obtained from the search results.

Alternatively, if the user indicates that he or she is not capable of navigating (or is not willing to navigate) the particular marketplace in which a search has been extended, then the user is allowed to review the search results of the extended search within the user's local marketplace. For example, an item details page from the particular marketplace (e.g., the marketplace in France) corresponding to one of the products in the search result may be translated/converted in a form that is able to be understood by the user (e.g., a user in the United States who does not understand French and/or does not utilize Euros). Further, the user may purchase an item obtained from the search results in the local marketplace as opposed to purchasing the product in the particular marketplace (e.g., the marketplace in France).

Figure 3:
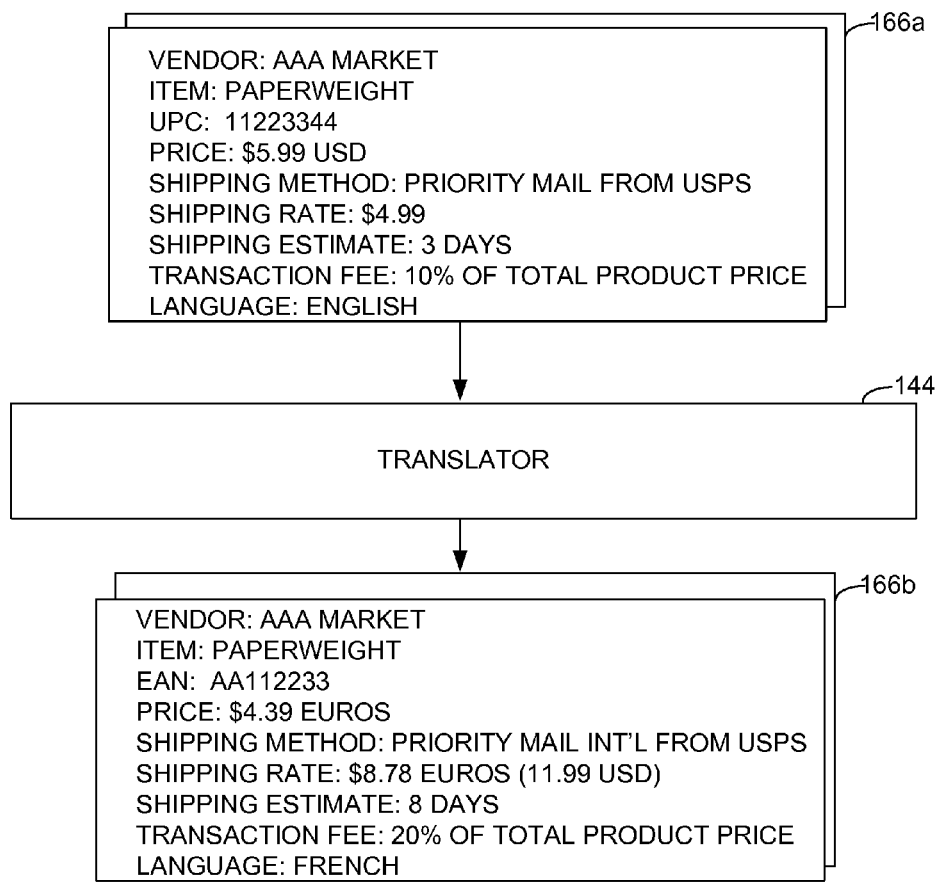
FIG. 3 is a schematic block diagram that provides one example illustration of a translator application employed in an electronic commerce application of FIG. 1 according to various embodiments of the present disclosure.

Referring next to FIG. 3, shown is a representation of functionality of a translator application 144. Inventory data 166a for a product within a first marketplace (e.g., United States marketplace) is shown as input to the translator application 144, where the inventory data 166a includes vendor, item, UPC, price, shipping method, shipping rate, shipping estimate, transaction fee, and language for the first marketplace. The translator application 144 converts or translates the inventory data into a form used or recognized for a second marketplace (e.g., France marketplace). For example, a product price is converted from USD (United States dollars) to Euros, which is a form of currency used in France, using a current currency exchange rate, the shipping estimate has been increased to 8 days from 3 days, and text is translated and/or provided in French (from English).

Referring next to FIG. 4, shown is a network page 150b for offering a user an option to extend a search to a different marketplace. The network page 150b is rendered in user interface 201b. The page 150b contains a message stating that the user did not find what he or she was looking in a marketplace (e.g., a United States marketplace) and offers the user to extend the search out to another marketplace (e.g., France, Germany, United Kingdom). Specifically, the network page 150b includes a listing of a plurality of geographical marketplaces 301. The network page 150b further indicates that the geographical marketplaces 301 of France and the United Kingdom are selected as indicated by the selector buttons 302. In one embodiment, after the electronic commerce application 133 verifies that another marketplace has a product matching or likely matching the user's search query, the user is provided an option to extend the user's search to the other marketplace.

Figure 5A:
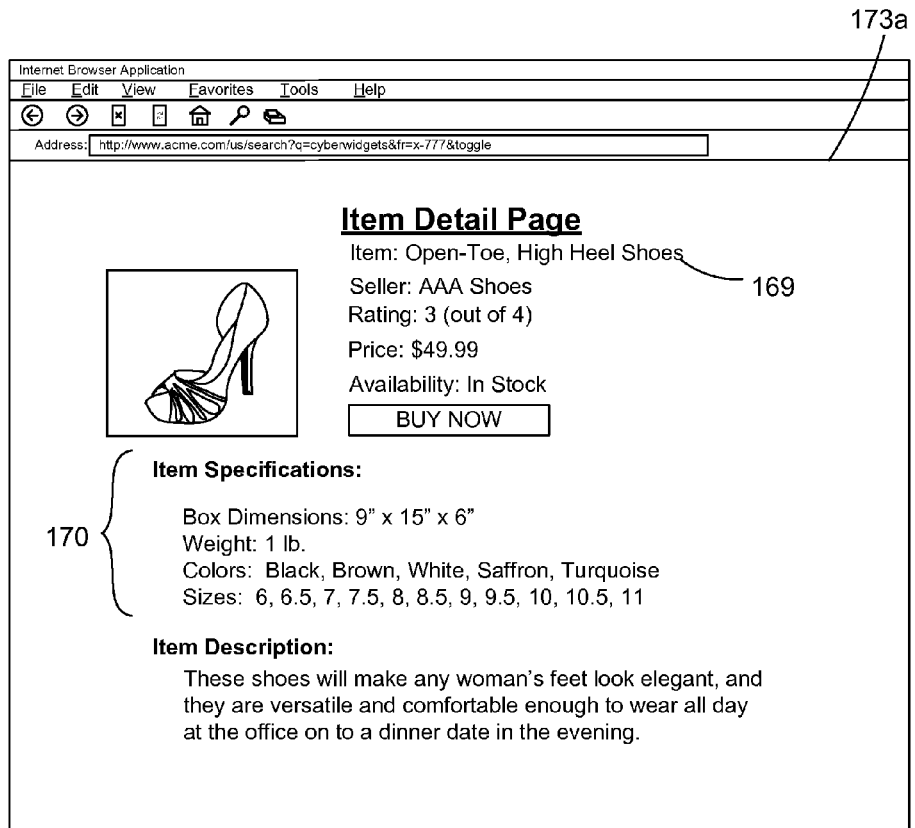
Figure 5B:
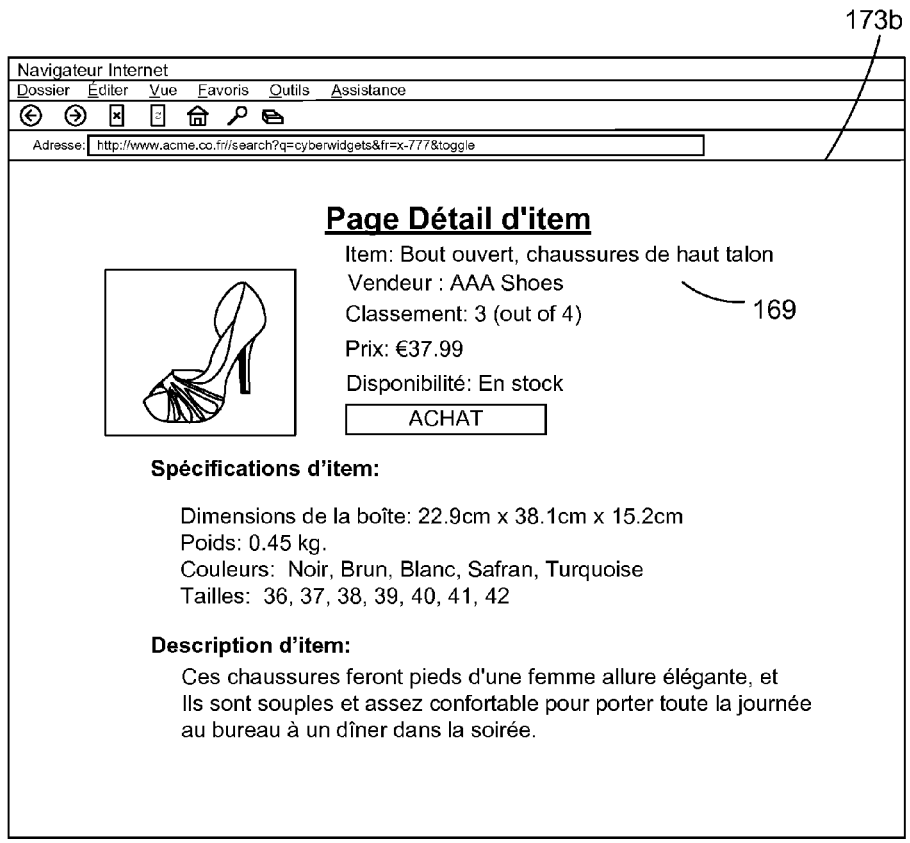
Figure 6:
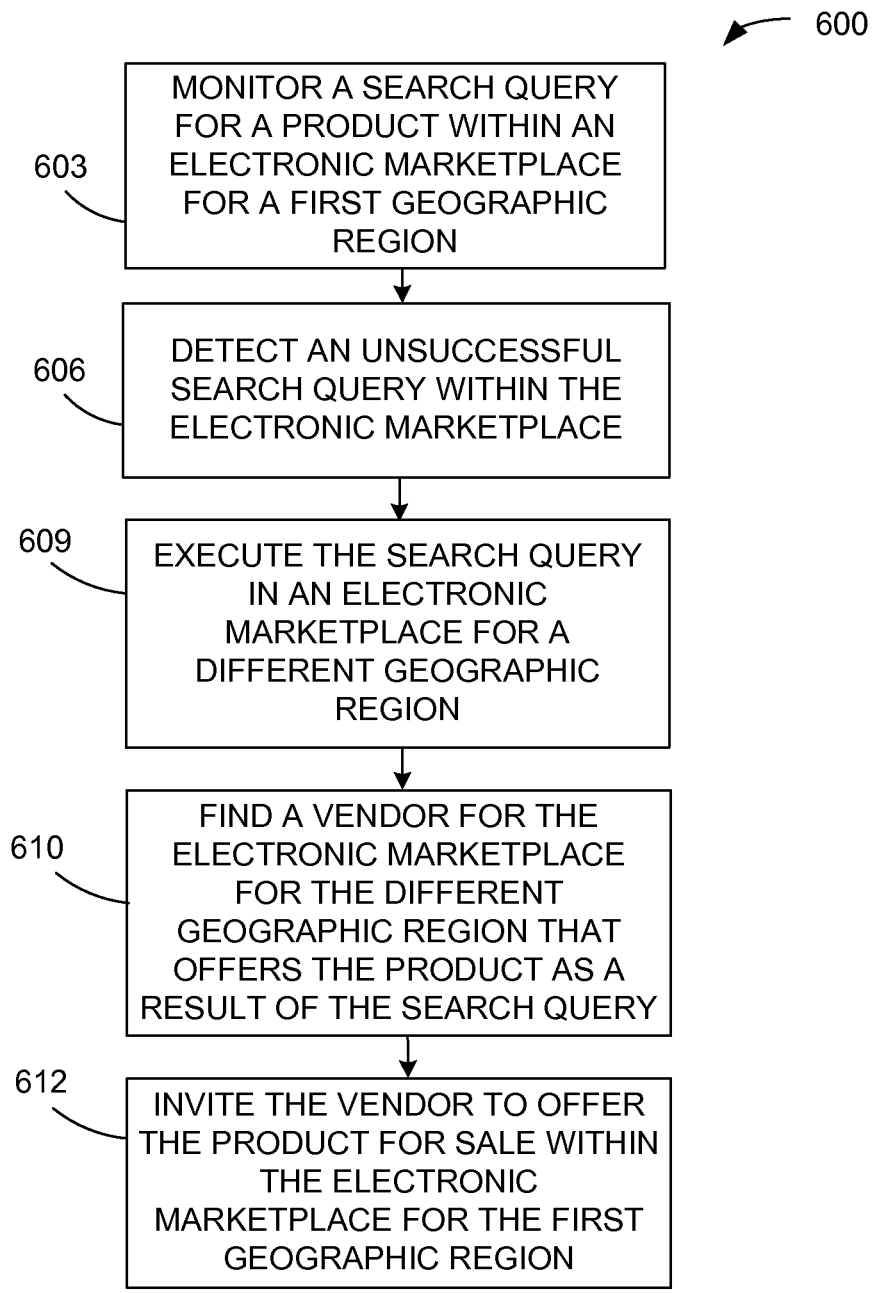
FIGS. 6-11 are flowcharts illustrating various examples of functionality implemented as portions of an electronic commerce application executed in a computing device in the data communications network of FIG. 1 according to various embodiments of the present disclosure.

FIGS. 5A and 5B illustrate examples of a user interface 201, denoted herein as user interface 201c, rendering various item detail pages 173. Each of the various item detail pages 173 is rendered in a user interface 201c on the display device 199b (FIG. 1) of the second client 106b (FIG. 1). Information stored in the data store 153 (FIG. 1) on the computing device 103 (FIG. 1) may be presented to a user on an item detail page 173 communicated by the network interface application 139 (FIG. 1) over the network 109 (FIG. 1) to the second client 106b. Also, the user interface 201c provides one example of the many different user interfaces 201 that may be created for different types of display devices 199b employed on a respective client 106. For example, the user interface 201c may be formatted differently to fit on a small display screen of a personal digital assistant or other mobile device, etc. Additionally, different graphical user interface (GUI) components may be used.

Referring to FIG. 5A, shown is an example of an item detail page 173a corresponding to an item 169 (FIG. 1), which is an open-toe, high-heel shoe, for example, and the item detail page 173a also corresponds to a geographical marketplace 159 (FIG. 1), which is the United States in this example. The item detail page 173a includes information such as the price, an item representation, item specifications 179 (FIG. 1), an item description, as well as an indication as to whether the item 169 is available. Further, the item specifications 179 correspond to the geographical marketplace 159. For example, the item detail page 173a lists shoe sizes, as well as English units of measure, consistent with the shoe sizes and units of measure conventionally used in the United States.

Turning now to FIG. 5B, shown is an example of an item detail page 173b corresponding to the item 169 (FIG. 1), which is also an open-toe, high-heel shoe, for example. The item detail page 173b illustrated in FIG. 5B is similar to the item detail page 173a illustrated in FIG. 5A, except that the item detail page 173b is customized for a different geographical marketplace 159 (FIG. 1), which corresponds to a marketplace targeting users from France. For example, the item detail page 173b includes metric units of measure, European shoe sizes, and the text on the item detail page 173b is written in French.

Let's assume a user inputted a search query for an open-toe, high-heel shoe in the United States marketplace and a number of product results from the search query is less than a set threshold value. In this case, the search query may be tried in one or more other marketplaces. For example, a marketplace for users from France may return a product result to the search query (after possible translation of the search query to the French language). Accordingly, the search may be extended to another marketplace, such as the marketplace for France. For example, after showing the results from the United States marketplace, the user may be presented an offer to extend the search to the France marketplace. Accordingly, content in a local marketplace is prioritized over content from another marketplace. Also, in a scenario, where a product is sold to a user of a second marketplace and the seller is a user of a first marketplace, the sale of the product occurs under control of the first marketplace, such that inventory data for the product is correctly accounted in the first marketplace.

The search within the marketplace for France finds the item detail page 173b shown in FIG. 5B. Since an item detail page is not available in the United States marketplace, the item detail page 173b from the France marketplace is converted to an item detail page 173a for the United States marketplace, as shown in FIG. 5A.

When the user in the United States is shown information about the seller within the France marketplace, the electronic commerce application 133 extrapolates or computes transaction information, such as shipping details and pricing information, for the United States marketplace. For example, the delivery time will generally need to be recalculated to account for extra shipping time needed to ship the product from the United States to France. Further, the seller in the second marketplace may be selling a product in another currency than currency used by a local marketplace of the buyer. Shipping rates may also be different in the two marketplaces. Also, adjusted pricing for the product may cover additional fees, such as a closing fee, attributed to the provider of the local marketplace of the buyer. The adjusted price may be translated to a local currency of the buyer using a currency exchange rate.

In one embodiment, a seller agrees to offer its products for sale in a second marketplace and sets the shipping and pricing options for the second marketplace. Accordingly, the seller is an active participant in this type of transaction and helps to set the shipping and pricing terms, such as shipping options and estimates of delivery time.

In another embodiment, the seller is a passive participant and has not made arrangements, in advance, to offer its products in the second marketplace. In one arrangement, a third party, such as the proprietor or owner of the online forums, buys the product from the seller under the terms of the second market, which is the local marketplace of the seller. The third party then immediately resells the product internally to the buyer at the first marketplace. The third party then directs the seller with shipping instructions to ship the product to the buyer, where the seller is compensated for additional shipping expenses than those charged by the seller to the buyer. The electronic commerce application 133 may be configured to account for shipping adjustments that estimate and adjust shipping charges from one marketplace to another marketplace.

In a different arrangement, the seller may have arranged with the third party to fulfill shipping of the seller's inventory to a buyer in a first or local marketplace with respect to the buyer. Accordingly, the third party maintains and controls the seller's product inventory in a second marketplace including fulfilling orders by picking products from inventory, packaging the products, and shipping the products to a buyer of the first marketplace from the third party's location. Therefore, when the third party facilitates the sale of the product to a buyer in the first marketplace, the third party can determine a reasonable price and shipping terms and provide the seller an agreed upon or further compensated portion of the sales price (as compared to a sales price between a local buyer and seller in the first marketplace).

Referring next to FIGS. 6-11, shown are flowcharts that provides examples of the operation of a portion of the electronic commerce application 133 (FIG. 1) according to various embodiments. It is understood that the flowcharts of FIGS. 6-11 provide merely an example of the many different types of functional arrangements that may be employed to implement the operation of at least a portion of the electronic commerce application 133 as described herein. As an alternative, the flowchart of FIG. 6, as an example, may be viewed as depicting an example of steps of a method 600 implemented in the computing device 103 (FIG. 1) according to one or more embodiments.

Beginning with box 603, a search query for a product within an electronic marketplace for a first geographic region is monitored by an electronic commerce application 133. In box 606, an unsuccessful search query within the electronic marketplace is detected by the electronic commerce application 133. In box 609, the search query is executed in an electronic marketplace for a different geographic region (second geographic region) by the electronic commerce application 133. In box 610, a vendor that offers the product in the electronic marketplace for the second geographic region is found as a result of the search query by the electronic commerce application 133. Then, in box 612, the vendor is invited to offer the product for sale within the electronic marketplace for the first geographic region by the electronic commerce application 133.

Figure 7:
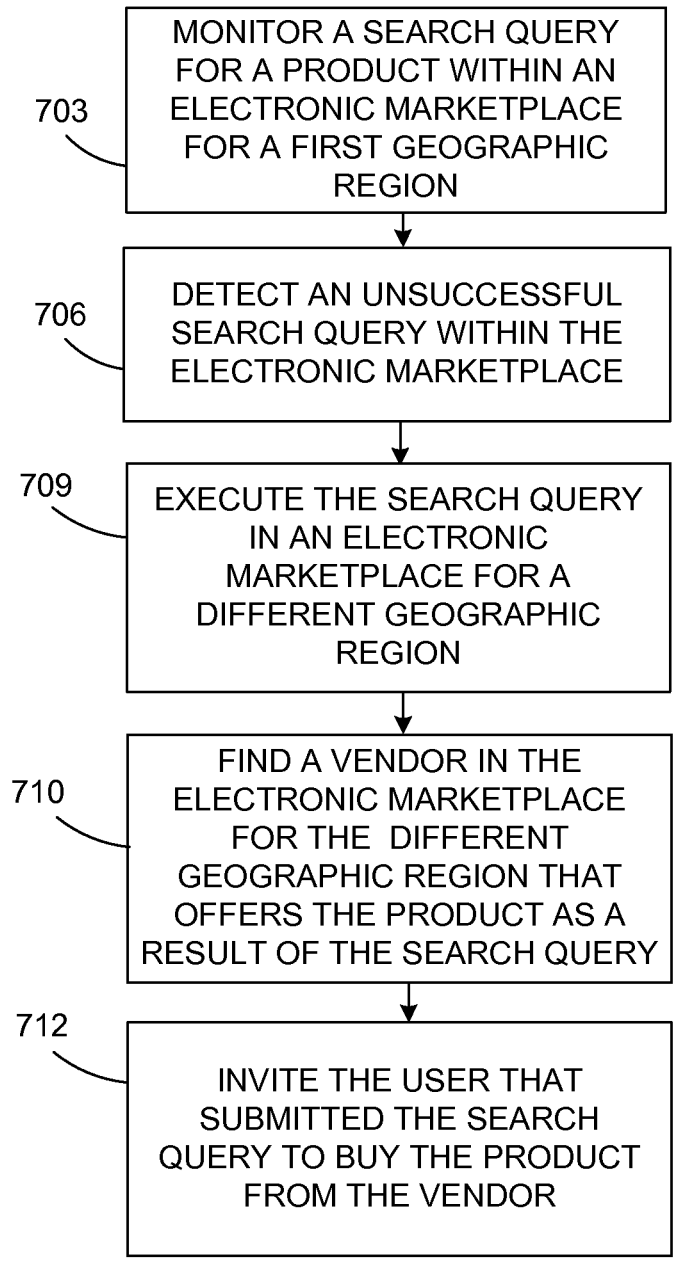

Referring next to FIG. 7, shown is a flowchart that provides another example of the operation of a portion of the electronic commerce application 133 (FIG. 1) according to various embodiments. Beginning with box 703, a search query for a product within an electronic marketplace for a first geographic region is monitored by an electronic commerce application 133. In box 706, an unsuccessful search query within the electronic marketplace is detected by the electronic commerce application 133. In box 709, the search query is executed in an electronic marketplace for a second and different geographic region by the electronic commerce application 133. In box 710, a vendor that currently offers the product in the second electronic marketplace is found as a result of the search query by the electronic commerce application 133. Then, in box 712, the user that submitted the search query is invited to buy the product from the vendor. In one implementation, a resulting purchase of the product may occur in the electronic marketplace for the first geographic region, such as when the user does not prefer to navigate the marketplace for the second geographic region. In some implementations, however, the resulting purchase of the product may instead occur in the electronic marketplace for the second geographic region, such as when the user is comfortable navigating the marketplace for the second geographic region.

Figure 8:
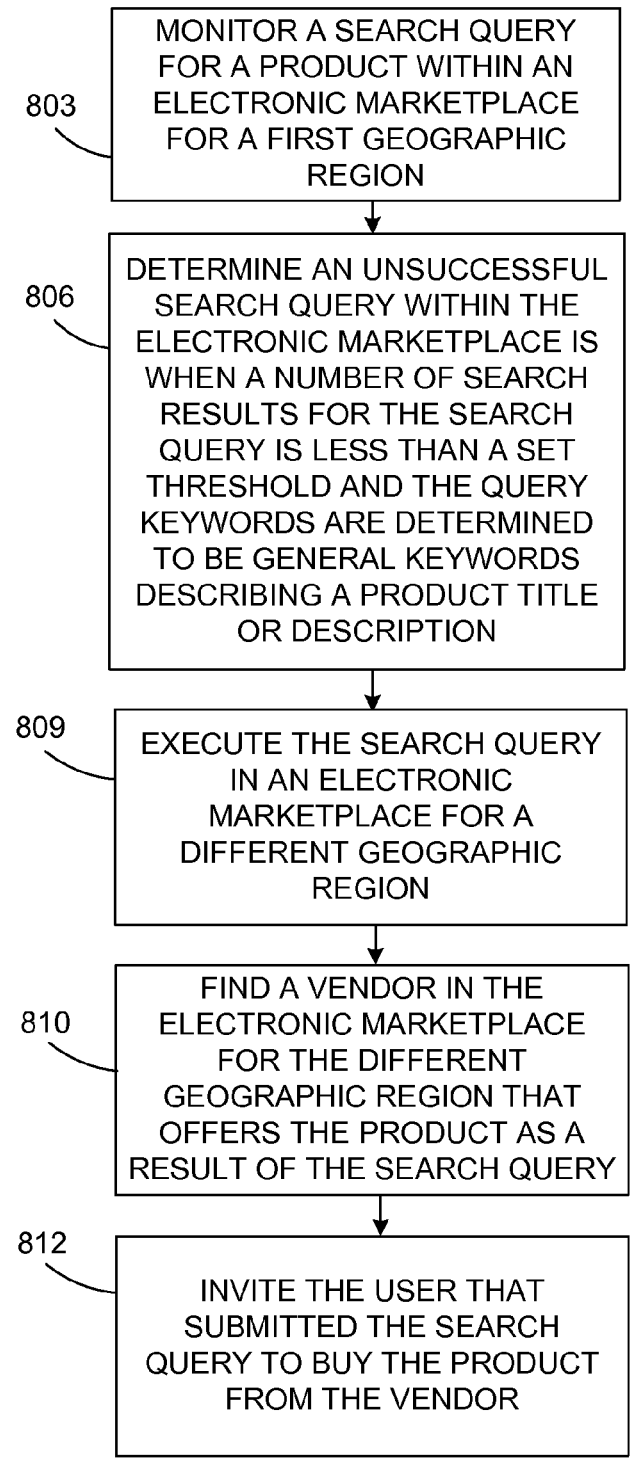

Referring next to FIG. 8, shown is a flowchart that provides yet another example of the operation of a portion of the electronic commerce application 133 (FIG. 1) according to various embodiments. Beginning with box 803, a search query for a product within an electronic marketplace for a first geographic region is monitored by an electronic commerce application 133. In box 806, an unsuccessful search query within the electronic marketplace is determined when a number of search results for the search query is less than a set threshold and the query keywords are determined to be general keywords describing a product title or description (as opposed to a product serial number, model number, or other product identifier). In box 809, the search query is executed in an electronic marketplace for a second and different geographic region. In box 810, a vendor for the electronic marketplace for the second geographic region that offers the product is found as a result of the search query by the electronic commerce application 133. Then, in box 812, the user that submitted the search query is invited, by the electronic commerce application 133, to buy the product from the vendor. As previously discussed, in one implementation, a resulting purchase of the product may occur in the electronic marketplace for the first geographic region. In some implementations, however, the resulting purchase of the product may alternatively occur in the electronic marketplace for the second geographic region.

Figure 9:
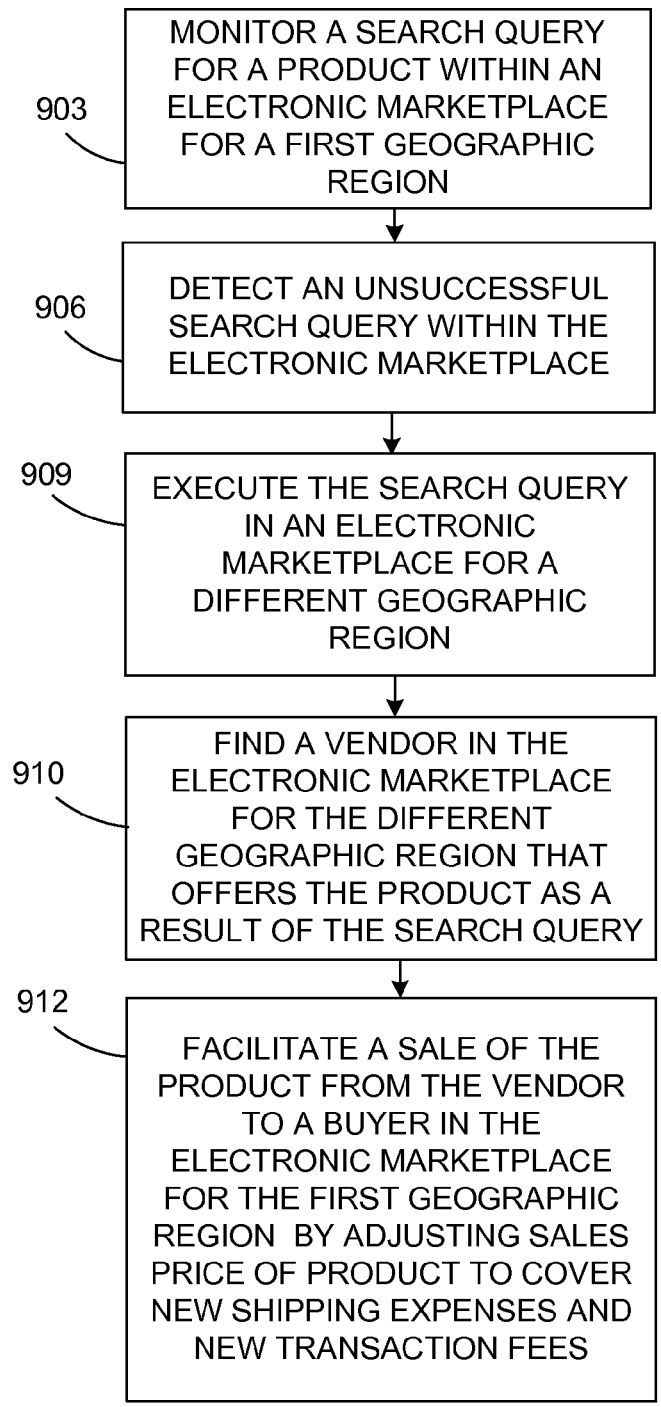

Referring next to FIG. 9, shown is a flowchart that provides a further example of the operation of a portion of the electronic commerce application 133 (FIG. 1) according to various embodiments. Beginning with box 903, a search query for a product within an electronic marketplace for a first geographic region is monitored by an electronic commerce application 133. In box 906, an unsuccessful search query within the electronic marketplace is detected by the electronic commerce application 133. In box 909, the search query is executed in an electronic marketplace for a second and different geographic region. In box 910, a vendor that offers the product for sale in the electronic marketplace for the second geographic region is found as a result of the search query by the electronic commerce application 133. Then, in box 912, a sale of the product from the vendor to a buyer in the electronic marketplace for the first geographic region is facilitated by the electronic commerce application 133 by adjusting the sales price of the product to cover at least new shipping expenses and new transaction fees for selling the product in the electronic marketplace for the first geographic region.

Figure 10:
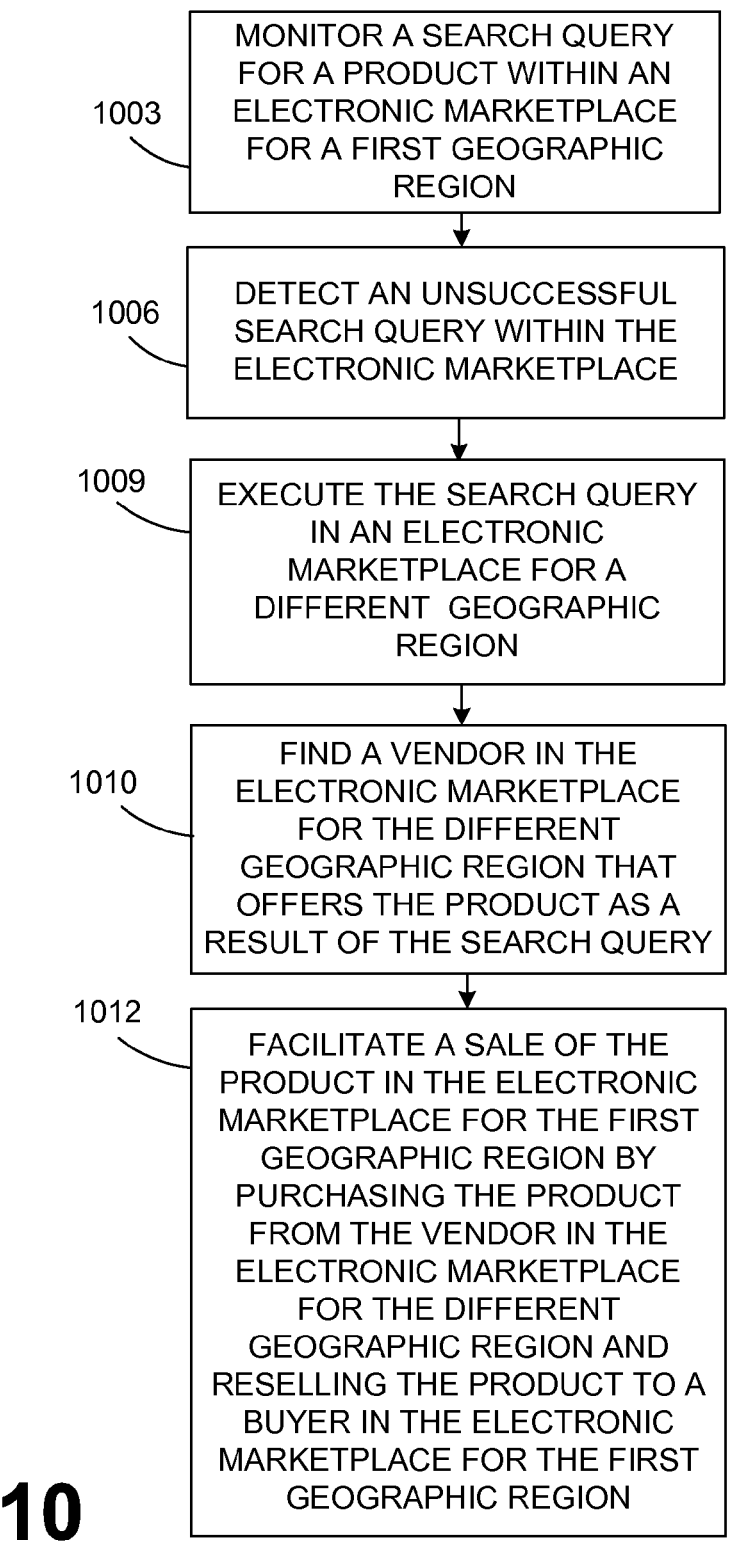

Referring next to FIG. 10, shown is a flowchart that provides yet another example of the operation of a portion of the electronic commerce application 133 (FIG. 1) according to various embodiments. Similar to FIG. 9, beginning with box 1003, a search query for a product within an electronic marketplace for a first geographic region is monitored by an electronic commerce application 133. In box 1006, an unsuccessful search query within the electronic marketplace is detected by the electronic commerce application 133. In box 1009, the search query is executed in an electronic marketplace for a second geographic region by the electronic commerce application 133. In box 1010, a vendor that offers the product in the electronic marketplace for the second geographic region is found as a result of the search query by the electronic commerce application 133. Then, in box 1012, a sale of the product from the vendor is facilitated by internally purchasing the product in the electronic marketplace for the second geographic region and reselling the product to the buyer in the electronic marketplace for the first geographic region.

Figure 11:
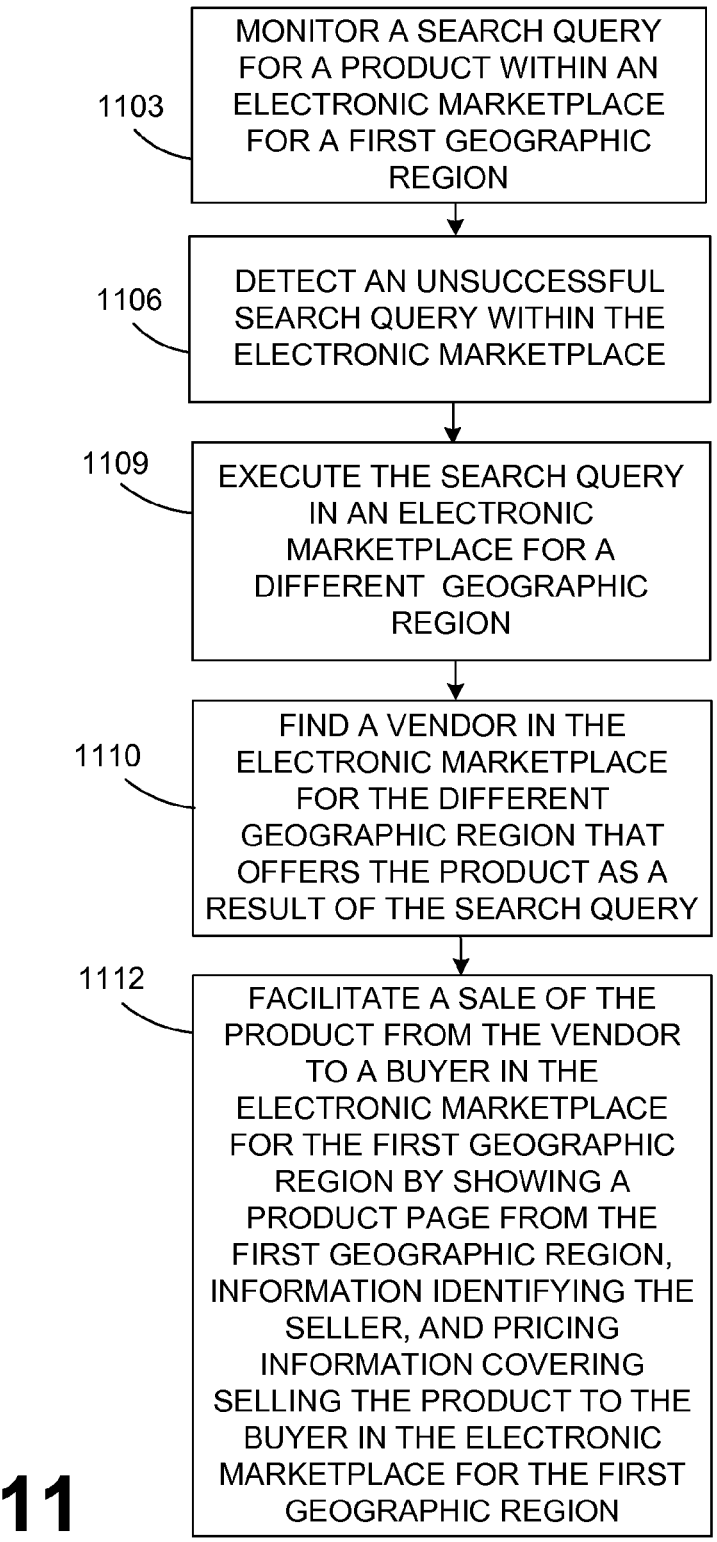

Referring next to FIG. 11, shown is a flowchart that provides a further example of the operation of a portion of the electronic commerce application 133 (FIG. 1) according to various embodiments. Beginning with box 1103, a search query for a product within an electronic marketplace for a first geographic region is monitored by an electronic commerce application 133. Accordingly, similar to FIG. 10, in box 1106, an unsuccessful search query within the electronic marketplace is detected by the electronic commerce application 133. In box 1109, the search query is executed in an electronic marketplace for a second and different geographic region by the electronic commerce application 133. In box 1110, a vendor that offers the product for sale in the electronic marketplace for the second geographic region is found as a result of the search query by the electronic commerce application 133. Then, in box 1112, a sale of the product from the vendor to the buyer is facilitated by the electronic commerce application 133 by at least showing a product page (e.g., item detail page 173a) from the electronic marketplace for the first geographic region and associating the vendor as a seller of the product and listing pricing information covering selling the product item to the buyer in the electronic marketplace for the first geographic region.

In another embodiment, a sale of the product from a vendor is facilitated by showing a product page from an electronic marketplace local to a prospective buyer and listing pricing information covering selling the product to the buyer from the vendor. Alternatively, in one embodiment, sale of the product from the vendor is facilitated by showing a product page having content from a local electronic marketplace of the vendor that is converted to a form suitable for an electronic marketplace of a buyer and listing pricing information covering selling the product to the buyer from the vendor.

In some embodiments, where an item detail page 173a previously exists for one marketplace 159, another item detail page 173b may be encoded based, at least in part, on the previously existing item detail page 173, which may include translating text, converting sizes, converting units of measure, as well as other customizations, that are suited for a second marketplace.

Figure 12:
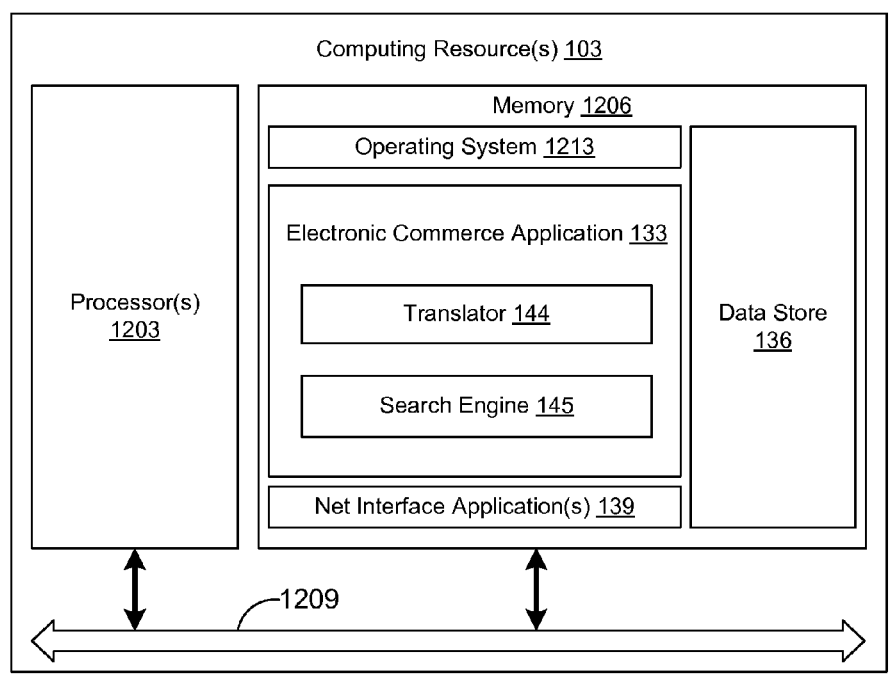
FIG. 12 is a schematic block diagram that provides one example illustration of a computing device employed in the data communications network of FIG. 1 according to various embodiments of the present disclosure.

With reference to FIG. 12, shown is a schematic block diagram of the computing device 103 according to an embodiment of the present disclosure. The computing device 103 includes at least one processor circuit, for example, having a processor 1203 and a memory 1206, both of which are coupled to a local interface 1209. To this end, the computing device 103 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the electronic commerce application 133, and potentially other applications. Also stored in the memory 1206 may be a data store 136 and other data. In addition, an operating system 1213 may be stored in the memory 1206 and executable by the processor 1203 and a network interface application 139 may be used to communicate using network protocols.

It is understood that there may be other applications that are stored in the memory 1206 and are executable by the processors 1203 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB (Universal Serial Bus) flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network 109 (FIG. 1) that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the electronic commerce application 133 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6-11 show the functionality and operation of an implementation of portions of the electronic commerce application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the FIGS. 6-11 show a specific order of execution, it is understood that the order of execution may differ from that which is depicted. For example, the order of execution of two or more blocks may be scrambled relative to the order shown. Also, two or more boxes shown in succession in FIGS. 6-11 show may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 133, that comprises software or code can be embodied in any computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    detecting, by at least one computing device, that a search query for a product item within a first marketplace is unsuccessful, wherein an unsuccessful search query does not return any product search results within the first marketplace;
    in response to the unsuccessful search query in the first marketplace, executing, by the at least one computing device, the search query for the product item within a second marketplace, wherein the second marketplace is separate and distinct from the first marketplace;

detecting, by the at least one computing device, that the search query for the product item within the second marketplace is successful, wherein a successful search query returns at least one product search result within the second marketplace; and in response to the successful search query in the second marketplace, offering, by the at least one computing device, a seller of the product item within the second marketplace to be listed as a seller in the first marketplace for the product item.

2. The method of claim 1, further comprising:

creating an item detail page associated with the first marketplace and the product item, wherein the item detail page is based at least in part on a previously existing item detail page associated with the product item and the second marketplace; and converting a sales price for the product item in the first marketplace from a sales price for the product item in the second marketplace.

3. The method of claim 2, wherein during creation of the item detail page associated with the first marketplace, text is translated from the previously existing item detail page associated with the product item from a foreign language to a language used by the first marketplace.

4. The method of claim 1, further comprising:

detecting that a second search query for a second product item within the first marketplace is unsuccessful, wherein an unsuccessful second search query returns a number of product search results within the first marketplace that is less than a set threshold value;

in response to the unsuccessful second search query, executing the second search query for the second product item within at least one additional marketplace, the at least one additional marketplace comprising a third marketplace;

detecting that the second search query for the second product item within the third marketplace is successful, wherein a successful second search query returns at least one product search result within the third marketplace, the at least one product search result comprising information identifying a second seller currently selling the second product item in the third marketplace; and in response to the successful second search query in the third marketplace, offering a user that submitted the second search query in the first marketplace to purchase, in the first marketplace, the second product item being sold by the second seller.

5. The method of claim 4, further comprising facilitating a sale of the second product item from the second seller to a proprietor of the first marketplace; and then facilitating a sale of the second product from the proprietor to the user within the first marketplace.

6. The method of claim 4, further comprising in response to the successful second search query in the third marketplace, offering the user that submitted the second search query to extend the second search query to the third marketplace.

7. The method of claim 1, further comprising:

detecting that a second search query for a second product item within the first marketplace is unsuccessful, wherein an unsuccessful second search query returns a number of product search results within the first marketplace that is less than a set threshold value;

in response to the unsuccessful second search query, executing the second search query for the second product item within at least one additional marketplace, the at least one additional marketplace comprising a third marketplace;

detecting that the second search query for the second product item within the third marketplace is successful, wherein a successful second search query returns at least one product search result within the third marketplace, the at least one product search result comprising information identifying a second seller currently selling the second product item in the third marketplace; and in response to the successful second search query in the third marketplace, offering a user that submitted the second search query in the first marketplace to purchase, in the second marketplace, the second product item being sold by the second seller.

8. The method of claim 1, further comprising:

detecting that a second search query for a second product item within the first marketplace is unsuccessful, wherein an unsuccessful second search query does not return any product search results within the first marketplace when the second search query comprises a product identification number for the second product item;

in response to the unsuccessful second search query, executing the second search query for the second product item within at least one additional marketplace, the at least one additional marketplace comprising a third marketplace;

detecting that the second search query for the second product item within the third marketplace is successful, wherein a successful second search query returns at least one product search result within the third marketplace, the at least one product search result comprising information identifying a second seller currently selling the second product item in the third marketplace; and in response to the successful second search query in the third marketplace, offering a user that submitted the second search query in the first marketplace to purchase the second product item being sold by the second seller.

9. The method of claim 8, further comprising facilitating a sale of the product from the second seller of the second product item in the third marketplace to a proprietor of the first marketplace; and then facilitating a sale of the second product item from the proprietor to the user within the first marketplace.

10. The method of claim 1, wherein the first marketplace is targeted to users from a first geographic region and the second marketplace is targeted to different users from a different geographic region.

11. A system, comprising:

at least one computing device; and a commerce application executable in the at least one computing device, the commerce application comprising:

logic that detects that a search query for a product item within a first marketplace is unsuccessful, wherein an unsuccessful search query does not return any product search results within the first marketplace;

logic that in response to the unsuccessful search query in the first marketplace, executes the search query for the product item within a second marketplace; wherein the second marketplace is separate and distinct from the first marketplace;

logic that detects that the search query for the product item within the second marketplace is successful, wherein a successful search query returns at least one product search result within the second marketplace; and logic that in response to the successful search query in the second marketplace, offers a seller of the product item within the second marketplace to be listed as a seller in the first marketplace for the product item.

12. The system of claim 11, wherein the commerce application further comprises:
   logic that creates an item detail page associated with the first marketplace and the product item, wherein the item detail page is based at least in part on a previously existing item detail page associated with the product item and the second marketplace; and
   logic that converts a sales price for the product item in the first marketplace from a sales price for the product item in the second marketplace.

13. The system of claim 12, wherein the logic that creates the item detail page associated with the first marketplace translates text from the previously existing item detail page associated with the product item from a foreign language to a language used by the first marketplace.

14. The system of claim 11, wherein the commerce application further comprises:
   logic that detects that a second search query for a second product item within the first marketplace is unsuccessful, wherein an unsuccessful second search query returns a number of product search results within the first marketplace that is less than a set threshold value;
   logic that in response to the unsuccessful second search query, executes the second search query for the second product item within at least one additional marketplace, the at least one additional marketplace comprising a third marketplace;
   logic that detects that the second search query for the second product item within the third marketplace is successful, wherein a successful second search query returns at least one product search result within the third marketplace, the at least one product search result comprising information identifying a second seller currently selling the second product item in the third marketplace; and
   logic that in response to the successful second search query in the third marketplace, offers a user that submitted the second search query in the first marketplace to purchase, in the first marketplace, the second product item being sold by the second seller.

15. The system of claim 14, wherein the commerce application facilitates a sale of the second product item from the second seller to a proprietor of the first marketplace and then a sale of the second product from the proprietor to the user within the first marketplace.

16. The system of claim 14, wherein the commerce application further comprises:
   logic that in response to the successful second search query in the third marketplace, offers the user that submitted the second search query to extend the second search query to the third marketplace.

17. The system of claim 11, wherein the commerce application further comprises:
   logic that detects that a second search query for a second product item within the first marketplace is unsuccessful, wherein an unsuccessful second search query returns a number of product search results within the first marketplace that is less than a set threshold value;
   logic that in response to the unsuccessful second search query, executes the second search query for the second product item within at least one additional marketplace, the at least one additional marketplace comprising a third marketplace;
   logic that detects that the second search query for the second product item within the third marketplace is successful, wherein a successful second search query returns at least one product search result within the third marketplace, the at least one product search result comprising information identifying a second seller currently selling the second product item in the third marketplace; and
   logic that in response to the successful second search query in the third marketplace, offers a user that submitted the second search query in the first marketplace to purchase, in the second marketplace, the second product item being sold by the second seller.

18. The system of claim 11, wherein the commerce application further comprises:
   logic that detects that a second search query for a second product item within the first marketplace is unsuccessful, wherein an unsuccessful second search query does not return any product search results within the first marketplace when the second search query comprises a product identification number for the second product item;
   logic that in response to the unsuccessful second search query, executes the second search query for the second product item within at least one additional marketplace, the at least one additional marketplace comprising a third marketplace;
   logic that detects that the second search query for the second product item within the third marketplace is successful, wherein a successful second search query returns at least one product search result within the third marketplace, the at least one product search result comprising information identifying a second seller currently selling the second product item in the third marketplace; and
   logic that in response to the successful second search query in the third marketplace, offers a user that submitted the second search query in the first marketplace to purchase the second product item being sold by the second seller.

19. The system of claim 18, wherein the commerce application facilitates a sale of the product from the second seller of the second product item in the third marketplace to a proprietor of the first marketplace and then a sale of the second product item from the proprietor to the user within the first marketplace.

20. The system of claim 11, wherein the first marketplace is targeted to users from a first geographic region and the second marketplace is targeted to different users from a different geographic region.

21. A non-transitory computer-readable medium storing a program executable in a computing device, the program comprising:
   code that detects that a search query for a product item within a first electronic marketplace is unsuccessful, wherein an unsuccessful search query does not return any product search results within the first electronic marketplace;
   code that in response to the unsuccessful search query in the first electronic marketplace, executes the search query for the product item within a second electronic marketplace;
   code that detects that the search query for the product item within the second electronic marketplace is successful, wherein a successful search query returns at least one product search result within the second electronic marketplace;
   code that in response to the successful search query in the second electronic marketplace, offers a seller of the product item within the second electronic marketplace to be listed as a seller in the first electronic marketplace for the product item;

code that creates an item detail page associated with the first electronic marketplace and the product item, wherein the item detail page is based at least in part on a previously existing item detail page associated with the product item and the second electronic marketplace; and code that converts a sales price for the product item in the first electronic marketplace from a sales price for the product item in the second electronic marketplace, wherein the first electronic marketplace is an e-commerce storefront accessible via a Web site and the second electronic marketplace is a separate e-commerce storefront accessible via a separate Web site.

22. The non-transitory computer-readable medium of claim 21, further comprising code that in response to the successful search query in the second electronic marketplace, offers a user that submitted the search query in the first electronic marketplace to purchase the product item being sold by the seller.

23. The non-transitory computer-readable medium of claim 21, wherein the code that creates the item detail page associated with the first electronic marketplace translates text from the previously existing item detail page associated with the product item to a language used by the first electronic marketplace.

* * * * *